(12) United States Patent
Al-Taq et al.

(10) Patent No.: US 11,981,863 B2
(45) Date of Patent: May 14, 2024

(54) METHOD AND COMPOSITION TO ENHANCE THE PERFORMANCE OF ENCAPSULATED BREAKERS

(71) Applicant: SAUDI ARABIAN OIL COMPANY, Dhahran (SA)

(72) Inventors: Ali Abdullah M. Al-Taq, Qatif (SA); Basil Mansour Alfakher, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/746,039

(22) Filed: May 17, 2022

(65) Prior Publication Data

US 2023/0374373 A1 Nov. 23, 2023

(51) Int. Cl.
*C09K 8/68* (2006.01)
*C09K 8/70* (2006.01)
*C09K 8/72* (2006.01)

(52) U.S. Cl.
CPC ............... *C09K 8/68* (2013.01); *C09K 8/706* (2013.01); *C09K 8/72* (2013.01)

(58) Field of Classification Search
CPC ....................................................... E21B 36/00
See application file for complete search history.

(56) References Cited

U.S. PATENT DOCUMENTS

| | | | |
|---|---|---|---|
| 5,102,558 | A | 4/1992 | McDougall et al. |
| 5,591,700 | A | 1/1997 | Harris et al. |
| 7,464,754 | B1 | 12/2008 | Decker et al. |

(Continued)

FOREIGN PATENT DOCUMENTS

| | | |
|---|---|---|
| CA | 3001550 A1 | 5/2017 |
| EP | 2981588 B1 | 5/2018 |

(Continued)

OTHER PUBLICATIONS

Still, John W., et al. "An improved encapsulated breaker to decrease hydrostatic release and increase thermal stability", International Symposium on Oilfield Chemistry. Feb. 5, 2003, pp. 1-9, [9 Pages].

(Continued)

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

A composition for fracturing a wellbore may include a reacting fluid. The reacting fluid includes an encapsulated breaker, sodium nitrite, and an ammonium-comprising compound. The sodium nitrite and the ammonium-comprising compound undergo an exothermic reaction producing heat operable to release the encapsulated breaker, releasing the breaker that then reduces viscosity in the polymer-comprising fluid. A method for fracturing a wellbore may include injecting into a fractured wellbore a fluid comprising an ammonium-comprising compound and a fluid comprising sodium nitrite. The fractured wellbore has been fractured with a fracturing fluid comprising an encapsulated breaker. Sodium nitrite and the ammonium-comprising compound undergo an exothermic chemical reaction that generates heat to release the encapsulated breaker.

18 Claims, 4 Drawing Sheets

(56) References Cited

U.S. PATENT DOCUMENTS

| | | | |
|---|---|---|---|
| 8,695,704 B2 | 4/2014 | Muthusamy et al. | |
| 9,657,552 B2 | 5/2017 | Choudhary et al. | |
| 9,976,073 B2 | 5/2018 | Salla et al. | |
| 10,053,614 B2 | 8/2018 | Al-Nakhli et al. | |
| 10,442,978 B2 | 10/2019 | Al-Nakhli et al. | |
| 2015/0000912 A1* | 1/2015 | Choudhary | E21B 36/008 |
| | | | 166/300 |
| 2015/0300142 A1 | 10/2015 | Al-Nakhli et al. | |
| 2016/0244661 A1* | 8/2016 | Almubarak | C09K 8/845 |
| 2018/0305600 A1 | 10/2018 | Lucas et al. | |
| 2020/0277528 A1* | 9/2020 | Taylor | E21B 43/2408 |

FOREIGN PATENT DOCUMENTS

| | | | |
|---|---|---|---|
| GB | 2581883 A | 9/2020 |
| GB | 2582218 A | 9/2020 |
| WO | 2020165572 A1 | 8/2020 |
| WO | 2020165576 A1 | 8/2020 |
| WO | 2020236144 A1 | 11/2020 |

OTHER PUBLICATIONS

Chen, Chen-Tung A. "Specific heat capacities of aqueous sodium chloride solutions at high pressures", Journal of Chemical and Engineering Data. Jul. 1982, pp. 356-358, [3 Pages].

"Water Boiling Points at Higher Pressures", The Engineering Toolbox. 2005, pp. 1-12, [12 Pages].

Lo, Sho-Wei, et al. "Encapsulated breaker release rate at hydrostatic pressure and elevated temperatures", InSPE Annual Technical Conference and Exhibition. Sep. 29, 2002, pp. 1-15, [15 Pages].

\* cited by examiner

METHOD AND COMPOSITION TO ENHANCE THE PERFORMANCE OF ENCAPSULATED BREAKERS

BACKGROUND

Hydraulic fracturing operations are frequently utilized to improve recovery of hydrocarbons, typically in the form of oil or gas, from a reservoir by increasing the permeability of a geological formation that then allow the hydrocarbons to flow freely from the reservoir. Hydraulic fracturing requires several different types of fracturing fluids that are pumped into a reservoir that bears hydrocarbons. This often takes the form of introducing fluids, under pressure, to produce fractures in the geological formation.

The various fracturing fluids pumped into a geological formation may include pad fluids, proppant fluids, and overflush fluids. A pad fluid is a fluid with a viscosity sufficient to initiate and propagate the fractures in the geological formation. A proppant fluid introduces a material known as proppant into the geological formation. Proppant is typically made up of particles such as sand or other materials that serve to physically hold the fractures open so that hydrocarbons can flow out of the geological formation. A fluid of particular viscosity may be required to carry the proppant material into the fractures, to allow the fracturing fluid to flow, and to allow for the performance of other stages of a fracturing treatment. Viscosities for some proppant fluids may range from 200 centipoise (cP) to 1000 cP. Other proppant fluids may have various viscosities. An overflush fluid is a fluid that is used to push the proppant fluid into the fractures. This fluid must have a viscosity sufficient for pushing the proppant fluid. Typical viscosities for some overflush fluids may range from 3 to 10 cP, although for other overflush fluids the values may also vary. Viscosities for pad fluids may vary depending on the geometry of the fractures Pad fluids, proppant fluids, and overflush fluids, as well as other types of fracturing fluids are often viscous or gelled polymeric fluids. Proper cleanup of these fluids is required to ensure productivity of oil and gas wells that utilize such fracturing treatments, as remaining fluid may serve to block the hydrocarbons from entering the wellbore during production.

To allow for cleanup of fracturing fluids, the viscosity of these fluids needs to be changed, both to allow the fluid to leave the fractures and enter the wellbore, leaving the proppant behind, and to allow the fracturing fluid to flow out of the wellbore. Breakers are additives which serve to change the viscosity of fracturing fluids and can be added to fluids comprising polymers to change their viscosity.

Breakers are often encapsulated to allow for controlled release at the desired location. This allows for higher concentrations of breaker to be utilized than would otherwise be feasible due to changes in fracturing fluid properties. High temperatures may lead to the release breakers from encapsulation.

SUMMARY

Certain embodiments of the disclosure will be described with reference to the accompanying drawings, where like reference numerals denote like elements. It should be understood, however, that the accompanying figures illustrate the various implementations described and are not meant to limit the scope of various technologies described.

In one aspect, one or more embodiments disclosed here relate to a method to enhance performance of encapsulated breakers. The method may include injecting into a fractured wellbore a fluid including an ammonium-comprising compound through a first tubing and a fluid including sodium nitrite through a second tubing, where the fractured wellbore has been fractured with a fracturing fluid including an encapsulated breaker and reacting the ammonium-comprising compound and the sodium nitrite in an exothermic chemical reaction, the exothermic chemical reaction generating heat to release the encapsulated breaker.

In a further aspect, one or more embodiments disclosed herein relate to a composition. The composition may include a reacting fluid for breaking chemical bonds in a polymer in a geological formation including an encapsulated breaker, sodium nitrite, and an ammonium-comprising compound, where the sodium nitrite and the ammonium-comprising compound undergo an exothermic reaction producing generated heat where the generated heat is operable release the encapsulated breaker.

Other aspects and advantages of this disclosure will be apparent from the following description made with reference to the accompanying drawings and the appended claims.

DETAILED DESCRIPTION

Figure 1:
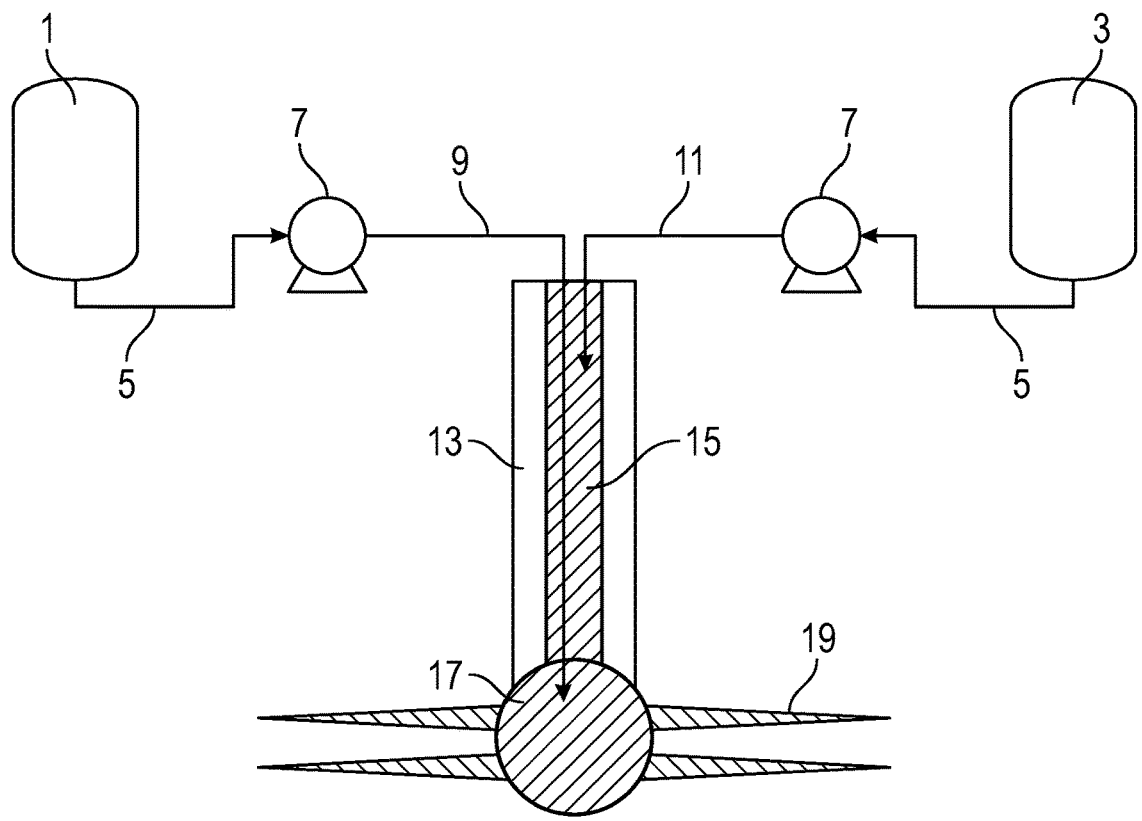
FIG. 1 is a drawing detailing one or more embodiments of this invention showing reactants stored in tanks 1 and 3 being injected into a well and mixing in a mixing region 17 near the fractures 19.

Fracturing fluids are fluids that are placed into a well as part of a hydraulic fracturing treatment. These fluids may be either oil-based or water-based. During a hydraulic fracturing treatment, the casing, or pipe fixed into the wellbore to separate the wellbore from the geological formation, is perforated to make openings into the surrounding rock. Fracturing fluid is pumped into the well to create fractures in the rock to assist with the production of hydrocarbons. Fracturing fluids typically comprise water, polymers, breakers, and/or surfactants.

A breaker is a class of material that may be used in an oil or gas well for the purpose of reducing the viscosity of a fracturing fluid. The fracturing fluid whose viscosity is to be reduced may contain any number of polymers known to individuals skilled in the art. These include, but are not limited to, guar polymers, cellulose derivatives, locust bean gum, other polysaccharides, glucomannan gums, and galactomannan gums. The viscosity of these polymers and their subsequent ability to flow in a well, in a geological formation, or throughout other spaces is an important property of these fluids. Reducing the viscosity of a fluid in a well allows these fluids to more easily flow out of and be removed from a well once they are no longer needed. Fluid left behind in fractures or a well may hinder the removal of oil or gas from the well. It may thus be desired to change the viscosity of these materials at various stages of the fracturing process. Breakers may be added to fracturing fluids to allow their viscosity to be reduced when viscosity change is desired.

Fracturing fluids also typically comprise proppants, which are particles such as sand added to fracturing fluid to hold open the fractures produced during the fracturing operation, allowing the hydrocarbon to flow from the reservoir through the fractures. These particles may have various compositions, geometries, or dimensions known to those in the art.

Fracturing fluids typically have a viscosity that allows for the fluid to be able to push the proppant into fractures. Once fracturing has occurred, the proppant remains behind and serves to hold the fractures open and prevent them from collapsing.

After fracturing occurs, the breaker serves to change the viscosity of various polymers downhole through several different means. These may include, but are not limited to, free radical oxidation of the polymer and enzyme degradation of the polymer.

The breaker itself may comprise any materials known to those skilled in the art. These may include, but are not limited to: peroxydisulfate salts (persulfates) such as ammonium persulfate; various suitable enzymes such as, for example, hemicellulose, cellulase, and amyloglucosidase; acids such as fumaric acids; and combinations thereof.

Adding breaker to a fracturing fluid may change its properties based on the concentration of breaker in the fluid. Typically, a greater concentration of breaker will allow for the viscosity of various fracturing fluids to be reduced to a greater extent or at a more rapid rate. However, changing the fluid properties of the fracturing fluid may hinder its performance during the fracturing operation. For example, additional unencapsulated breaker (live breaker) may change the flow properties of the fracturing fluid, negatively altering the placement of the proppant in the fractures. Polymer loading may need to be increased when geological formation temperature increases due to viscosity requirements. Increasing the polymer loading at a given temperature may make it desirable to subsequently increase the breaker concentration to maintain performance.

Encapsulation is defined as the separation of the breaker material from the polymer in the fluid. It may be desirable to separate the breaker from the rest of the fluid for the purpose of delaying the degradation of the polymer or for delaying the decomposition of the breakers. This delay ensures that the breaker does not react with the polymer prematurely or decay before it can react with the polymer. This also enables the breaker to be added at higher concentrations without adversely affecting properties of the fracturing fluid comprising the breaker, such as its viscosity. Physical characteristics of the fracturing fluid, such as viscosity, allow the breaker-comprising fluid to penetrate fractures alongside the proppant fluid. In addition, being able to encapsulate breaker enables the release of breaker in a controlled manner once the proppant is in place in the fractures. There are several types of encapsulation known to those skilled in the art.

Breakers may be encapsulated in an impermeable membrane, such as a polymer. The breaker may then be released once the membrane is crushed. Another type of encapsulation may be carried out by coating the breaker in a material that dissolves in the fracturing fluid to release the breaker. Another type of encapsulation may be carried out by coating the breaker in a membrane that undergoes osmotic swelling that causes perforation and releases the breaker. Another type of encapsulation may be carried out by coating the breaker in a porous material that the breaker diffuses through. Another type of encapsulation may be carried out by forming the breaker into a grain from which the breaker must dissolve into the fracturing fluid. Another type of encapsulation may be carried out by placing the breaker in a porous material so that dissolution of the breaker is slowed by the porous material. Another type of encapsulation may be carried out by coating the breaker in a material that will erode away and allow the breaker to dissolve in the fracturing fluid.

In the case of the use of an impermeable membrane, and without crushing, the breaker may be released either mechanically or hydrostatically. Mechanical release results from physical damage to the coating resulting from the movement of the encapsulated breaker through pumps, valves, pipes, and other equipment. Hydrostatic release occurs when the breaker is able to leak through imperfections in the encapsulation upon the addition of water. This occurs at low pressures, as higher pressures may repair the imperfections in the encapsulation. In one or more embodiments, the encapsulation or coating material is not completely impermeable; the increase in pressure may decrease the porosity of the coating material, making it more impermeable.

In one or more embodiments, the encapsulation may be water resistant and function at temperatures above the geological formation temperatures. In many types of encapsulation, the application of heat serves to increase the rate of release of the breaker from the encapsulation, allowing the breaker to perform its function of reducing polymer viscosity in a fracturing fluid.

Some breakers such as persulfates form free radicals that can serve to decompose a polymer via reduction of its molecular weight. In the case of persulfate breakers, heat is utilized to produce sulfate free radicals from the persulfate through homolytic cleavage. A sulfate free radical removes a hydrogen atom from a polymer chain or breaks other chemical bonds in the polymer, depending on the polymer chemistry, reducing the polymer molecular weight. Once the covalent bond is broken, a free radical segment is produced from the broken bond, producing a polymer with a free radical group. This polymer with a free radical either breaks apart into smaller components or removes a hydrogen atom, producing another free radical. Termination of this reaction ends when two free radicals combine. This molecular weight reduction subsequently causes the viscosity of a fluid to be reduced. However, free radicals are known to be short lived. Reaction The release of heat by chemical reaction downhole serves to provide a mechanism by which the release of breaker can be controlled. By manipulating reaction conditions such as concentration, pH, material chemistry, or other parameters known to those skilled in the art, the rate of reaction may be controlled, and breaker can be released into the well and/or geological formation at the proper time and location. This allows for optimization of the viscosity change in the fracturing fluid by controlling the timeline of release of the breaker from its encapsulation, thereby enhancing the performance of the encapsulated breaker in the fracturing fluid.

Several types of reactions may be used to release heat and/or pressure. Exothermic reactions are chemical reactions that release heat, which causes an increase in temperature in the surrounding fluid. These reactions may be any number of chemical reactions known to those skilled in the art and may include one or more reactants. Examples of chemical reactions that may be exothermic include acid/base reactions or oxidation/reduction reactions (redox).

In one or more embodiments of this invention, reactions of two or more thermochemicals such as ammonium compounds and sodium nitrite ($NaNO_2$) may serve as the exothermic reaction. These reactions produce products that include nitrogen gas and water, limiting their environmental impact. The remaining product is a salt, or a compound containing two differing ions.

Ammonium compounds that may be used with the present invention include, but are not limited to, ammonium chloride ($NH_4Cl$), and ammonium sulfate (($NH_4$)$_2SO_4$).

In one or more embodiments, the reactions can be represented as:

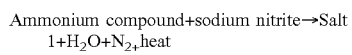
Ammonium compound+sodium nitrite→Salt 1+$H_2O$+$N_2$+heat

Salt 1 here is a material composed of the remaining ions from the ammonium compound and the sodium nitrite. This class of reactions has the added benefit of producing both heat and pressure, thus providing additional pressure to the fluids in the wellbore to aid in pushing the reduced-viscosity fracturing fluid from the wellbore.

One particular reaction of this class is that given as:

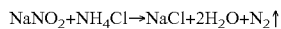
$NaNO_2$+$NH_4Cl$→$NaCl$+$2H_2O$+$N_2$↑

This particular reaction can produce heat and pressure inside of a geological formation. This reaction may be initiated by an optional acid. The optional acid can be any component that will reduce the pH of an aqueous solution to one that is suitable to initiate the exothermic reaction. Suitable acids may include, but are not limited to, acetic acid, formic acid, propionic acid, lactic acid, citric acid. In certain embodiments, the exothermic reaction may be triggered at a pH of about 3 to about 5. In one or more embodiments, when activated with acid, the range of the molar ratio of sodium nitrite to the ammonium-comprising compound may have an upper limit of about 4:1 or about 3:1, and a lower limit of about 1:1 or about 1.5:1, with any upper limit being able to be used in combination with any lower limit. When the system is activated by heat, the range of the molar ratio of sodium nitrite to the ammonium-comprising compound may have an upper limit of about 2:1 or about 1.5:1, and a lower limit of about 1:2 or about 1:1.5, with any upper limit being able to be used in combination with any lower limit. The molar ratio may depend on method of activation and/or the reaction. For example, for the reaction $2NaNO_2$+($NH_4$)$_2SO_4$→$2N_2$+$4H_2O$+$Na_2SO_4$+heat, two moles of sodium nitrite react with one mole of ammonium sulfate, so the ratio is 2. For an acid triggered reaction, the molar ratio may be 2, for example 2 mol of sodium nitrite to 1 mol of ammonium chloride. For a reaction activated by temperature, molar ratio may be 1, for example 1 mole sodium nitrite to 1 mole of ammonium chloride. In one or more embodiments, solutions comprising the reactants may have concentrations from about 1 mole per liter (mol/L or M) to about 5M prior to being injected into the wellbore. In one or more embodiments, the ammonium-comprising compound may be present in a solution at a concentration of from about 1M to about 5M prior to being injected into the wellbore. In one or more embodiments, the sodium nitrite may be present in a solution at a concentration of from about 1M to about 5M prior to being injected into the wellbore.

This exothermic reaction has the added benefit of producing reactants that are less harmful to the environment than many other potential heat or gas producing reactions known to those skilled in the art.

Introduction into the Wellbore

In one or more embodiments, these materials may be kept separated prior to being introduced into the wellbore to prevent the materials from reacting until the desired time. In one or more embodiments, solutions comprising reactants may be pumped as a postflush following a fracturing treatment.

Embodiments of the present disclosure may provide at least one of the following advantages. Various embodiments of the present disclosure may allow for control of breaker release. This may be done by manipulating various parameters of the reaction known to those skilled in the art. These may include, but are not limited to, pH, concentration, reaction components, and initial temperature. This allows the viscosity of the fracturing fluids to be decreased at the proper time, preventing undesired reduction in viscosity at too early of a stage in the fracturing process. In addition, in one or more embodiments, the well should be shut-in during the reaction, resulting in an increase in pressure during the reaction. This increase in pressure may result in expanding fractures downhole.

In one or more embodiments, the reactants may be pumped into the wellbore, along with an optional acid depending on the required chemistry, to reach the location of the proppant in the fracture. Upon reaching the location of the fracturing fluid in the fracture, a reacting fluid is formed. This may be left in place to allow for the reaction to proceed and for the temperature to increase. This would then allow the breaker to be released from its encapsulation, in part due to the increase in temperature. The breaker would then reduce the viscosity of the fracturing fluid in the geological formation through various means. This would then allow the fracturing fluid to potentially be removed and recovered.

In one or more embodiments, the reactants may be pumped together into the wellbore through the production tubing, mixing the reactants in a reactant solution with a pH from about 8 to about 9. An optional acid may be injected afterward through the coiled tubing, to reach the location of the fracturing fluid in the fracture and activate the reaction, forming a reacting fluid. These may be left in place to allow for the reaction to proceed and for the temperature to increase. This would then allow the breaker to be released from its encapsulation, in part due to the increase in temperature. The breaker would then reduce the viscosity of the fracturing fluid in the geological formation through various means. This would then allow the fracturing fluid to potentially be removed and recovered.

In one or more embodiments, the reactants may be pumped together into the wellbore through the production tubing, mixing the reactants in a reactant solution with a pH from about 8 to about 9. Upon reaching the location of the fracturing fluid in the fracture, a reacting fluid is formed. The reaction would be activated by heat when the temperature of the geological formation is at least about 70° C. The reactants may be left in place to allow for the reaction to proceed and for the temperature to increase. This would then allow the breaker to be released from its encapsulation, in part due to the increase in temperature. The breaker would then reduce the viscosity of the fracturing fluid in the geological formation through various means. This would then allow the fracturing fluid to potentially be removed and recovered.

In one or more embodiments, at least one of the reactants may be encapsulated, and the reactants, along with an optional acid, may be pumped into the wellbore along with the fracturing fluid, forming a reacting fluid. Once fracturing occurs, the reaction can take place in the reacting fluid and the temperature would increase. This would then allow the breaker to be released from its encapsulation, in part due to the increase in temperature. The breaker would then reduce the viscosity of the fracturing fluid in the geological formation through various means. This would then allow the fracturing fluid to potentially be removed and recovered.

In one or more embodiments, a solution comprising one of the reactants may be pumped through production tubing into the wellbore, and another solution comprising another reactant may be pumped through production tubing, with an optional acid being added to one of the reactant solutions. Upon reaching the location of the fracturing fluid after fracturing, a reacting fluid is formed. The reactants may be left in place to allow for the reaction to proceed and for the temperature to increase. This would then allow the breaker to be released from its encapsulation, in part due to the increase in temperature. The breaker would then reduce the viscosity of the fracturing fluid in the geological formation through various means. This would then allow the fracturing fluid to potentially be recovered.

In one or more embodiments, a solution comprising one of the reactants may be pumped through coiled tubing into the wellbore, and another solution comprising another reactant may be pumped through production tubing, with an optional acid being added to one of the reactant solutions. Upon reaching the location of the fracturing fluid after fracturing, a reacting fluid is formed. The reactants may be left in place to allow for the reaction to proceed and for the temperature to increase. This would then allow the breaker to be released from its encapsulation, in part due to the increase in temperature. The breaker would then reduce the viscosity of the fracturing fluid in the geological formation through various means. This would then allow the fracturing fluid to potentially be recovered. In one or more such embodiments, the ammonium-comprising solution and an organic acid may be pumped through the coiled tubing and the sodium nitrite solution may be pumped through the production tubing.

In one or more embodiments, the reaction may be initiated via the application of microwave radiation. This may be desirable in the absence of an optional acid or heat to trigger the reaction. The reactants may be pumped into the wellbore via one of the previously presented methods or through a different method and the reaction may be triggered by applying microwaves to the reactants in the well, triggering the reaction.

In one or more embodiments, solutions comprising reactants may be pumped as a postflush following a fracturing treatment, so that the solutions may ultimately displace the fracturing fluids in the wellbore. The mixture of solutions comprising the reactants may be displaced with hydrocarbons, such as diesel oil, rather than using an aqueous solution to avoid dilution of the reactants. Mixing of the reactants should start at the end of a horizontal wellbore and move toward the bend, where the vertical wellbore is located. The coiled tubing may be pulled out while the injection of the ammonium-comprising compound and the acid are being injected, and the reacting solution is formed. In one or more embodiments, the ratio of the reactants utilized should be approximately stoichiometric. That is, the ratio of the reactant salts should be that in the chemical reaction.

FIG. 1. is a schematic illustration of one or more embodiments of this invention. In these embodiments, a solution comprising $NH_4Cl$ and an acid are pumped from tank 1, through piping 5 using pump 7, and further through coiled tubing 9 into a mixing region 17 that is connected to fractures 19. A solution comprising $NaNO_2$ is pumped from tank 3 through piping 5 using pump 7, and further through pipe 11 into production tubing 15, surrounded by casing 13. The sodium nitrite then travels down to the mixing region 17 that is connected to fractures 19. The connection between mixing region 17 and fractures 19 allows the ammonium-comprising compound and the sodium nitrite to flow into the fractures and form the reacting solution. The exothermic reaction then occurs and increases the temperature in the fractures, releasing the encapsulated breaker. The breaker then reacts with a polymer in the fracturing fluid, reducing the viscosity of the fracturing fluid and allowing it to flow from the wellbore.

Figure 2:
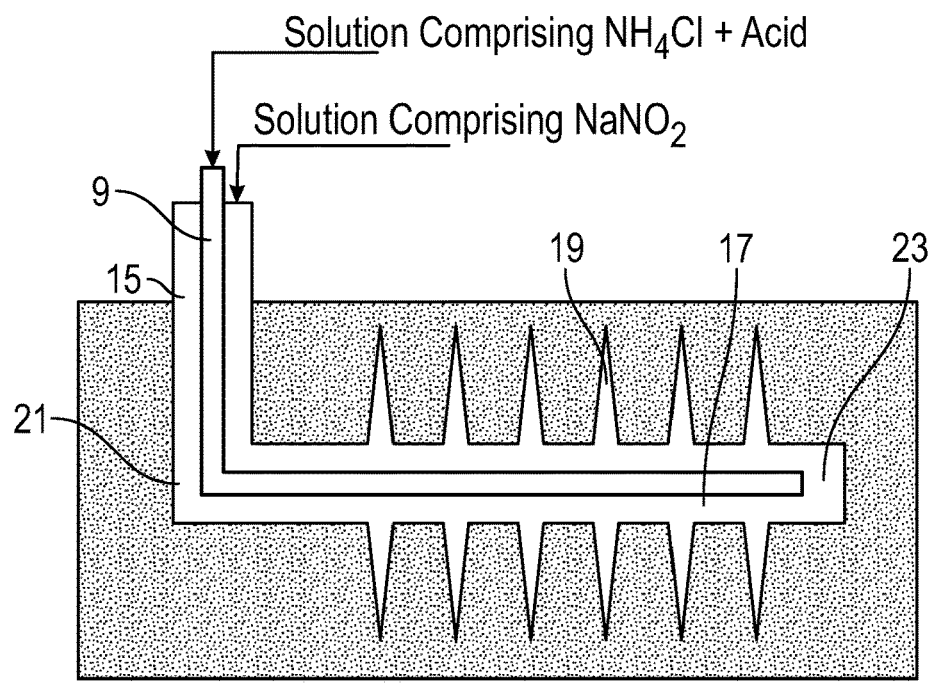
FIG. 2 is a drawing detailing the system of mixing of the thermochemicals, according to one or more embodiments.

FIG. 2 is a drawing detailing the system of mixing of the thermochemicals, according to one embodiment. In this system, production tubing 15 extends down through the ground, bending at a heel 21 before extending further into a toe 23, forming a mixing region 17. Fractures 19 are present, branching off of the mixing region 17 via holes in the production tubing 15. Coiled tubing 9 extends from the surface through the production tubing 15, bending at the heel 21, before reaching the toe 23.

In the embodiments of FIG. 2, during the injection, the sodium nitrite comprising solution is pumped into the production tubing 15 into the mixing region 17 through to the toe 23. The $NH_4Cl$ and acid comprising solution is pumped through coiled tubing 9 to the toe 23. The coiled tubing 9 is then pulled out while the $NH_4Cl$ and acid comprising solution is being pumped to allow for mixing. Mixing starts at the toe 23 and goes toward the heel 21 as the coiled tubing 9 is being pulled out.

FIGS. 1 and 2 are representative of only a few embodiments. Other embodiments are possible.

EXAMPLES

The following examples are merely illustrative and should not be interpreted as limiting the scope of the present disclosure.

Example 1

Figure 3:
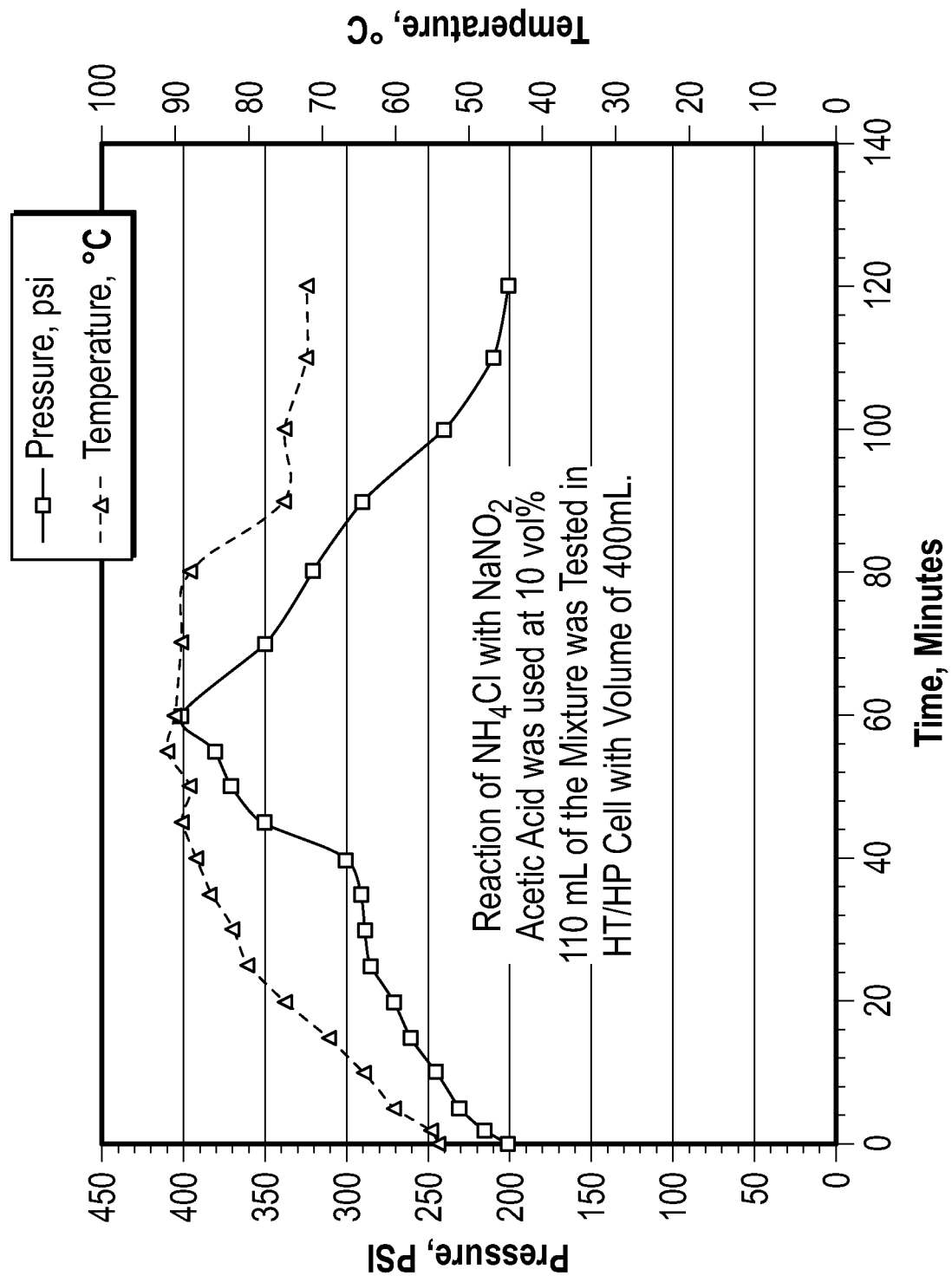
FIG. 3 is a plot detailing the pressure and temperature observed in a high temperature/high pressure cell with a constant volume of 400 mL during a reaction that may be used in a one or more embodiments, namely: $NH_4Cl + NaNO_2 \rightarrow NaCl + 2H_2O + N_2\uparrow$.

To assess the generated heat and pressure due to the exothermic reaction, temperature and pressure changes were recorded when performing a reaction between sodium nitrite and ammonium chloride under controlled conditions. Results are shown in FIG. 3. Here, 150 mL of a 3 M of $NaNO_2$ was reacted with 150 mL of a 1.5 M of $NH_4Cl$ in a 400 mL HT/HP filter press. Table 1 illustrates the composition of synthetic water in the base fluid, Table 2 illustrates the composition of the base fluid comprising $NaNO_2$ or $NH_4Cl$, and Table 3 illustrates the composition of the crosslinker solution used in Example 1. Materials in Tables 1, 2, and 3 were provided by NPS Company. 4.80 g of crosslinker solution is added into base fluid with all the additives in a blender for crosslinking test. Breaker (NBK-04S) is added at 0.3 pound per thousand gallons (ppt). Acetic acid was used at 10 vol %. As shown in FIG. 3, 110 mL of the mixture was tested in the HT/HP filter press and reacted.

TABLE 1

Composition of Synthetized Water

| Analysis | Concentration | Unit |
| --- | --- | --- |
| Bicarbonate | 232 | mg/L |
| Carbonate | 0 | mg/L |
| Hydroxide | 0 | mg/L |
| Barium | 0 | mg/L |
| Calcium | 316 | mg/L |
| Chloride | 1,642 | mg/L |
| Magnesium | 120 | mg/L |
| Potassium | 14 | mg/L |
| Sodium | 781 | mg/L |
| Strontium | 0 | mg/L |
| Sulfate | 668 | mg/L |
| Total Dissolved Solids | 3,773 | mg/L |
| Conductivity @ 25° C. | 5,220 | μmhos/cm |
| pH @ 25° C. | 7.9 | N/A |
| Specific Gravity @ 60° F. | 1.00 | N/A |

TABLE 2

Base Fluid Recipe

| Code | Description | Form | Additive Conc./Mgal | Additive Quantity for 500 mL |
| --- | --- | --- | --- | --- |
| Water | Synthetic water | Liquid | 994.9 Gal | 497 ml |
| NCS-02 | Liquid Clay Stabilizer | Liquid | 2 Gal | 1 ml |
| NBI-01 | Biocide | Liquid | 0.3 Gal | 0.15 ml |
| NAF-01 | Antifoaming Agent | Liquid | 0.3 Gal | 0.15 ml |
| NWG-08S | Guar Gelling Agent | Solid | 30 Lbs | 1.8 g |
| NSA-1S | Stabilizer Aid | Liquid | 1 Gal | 0.5 ml |
| NST-01 | Stabilizer | Solid | 10 Lbs | 0.6 g |
| NSA-05 | Flowback Surfactant | Liquid | 1.5 Gal | 0.75 ml |

TABLE 3

Crosslinker Solution Recipe for 280° F.

| Code | Description | Form | Crosslinker Conc./Mgal | Additive Quantity For 50 ml crosslinker |
| --- | --- | --- | --- | --- |
| Water | Water | Liquid | | 50 ml |
| NXL-01S | Borate Crosslinker | Solid | 10 Lbs | 10.00 g |
| NAC-01S | Activator | Solid | 20 Lbs | 20.00 g |
| NDA-01S | Delaying Agent | Solid | 20 Lbs | 20.00 g |

Figure 4:
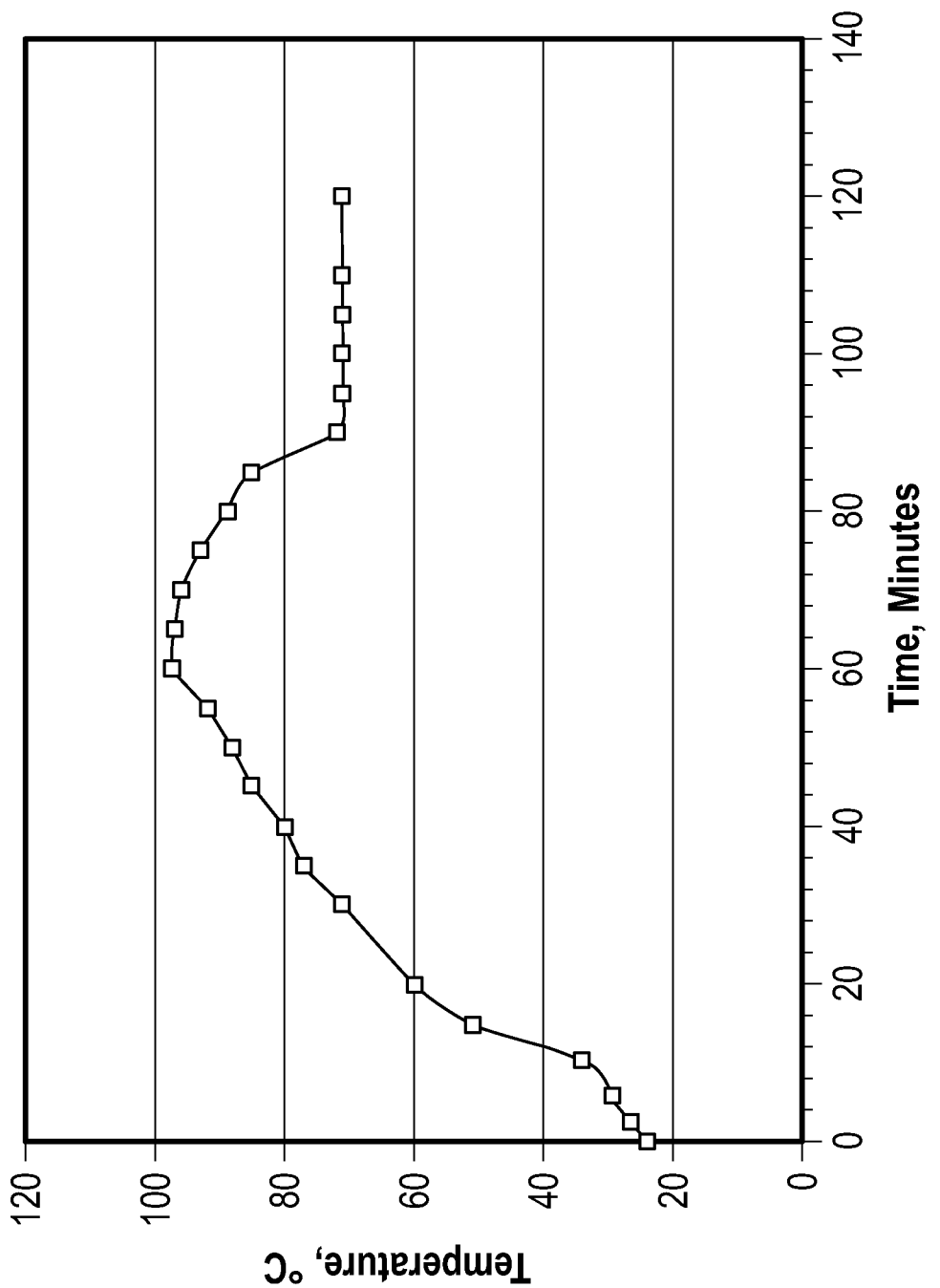
FIG. 4 is a plot detailing the temperature over time in Example 1 with an acetic acid concentration of 5 volume percent (vol %)

The temperature increased from 72 degrees Celsius (° C.) to 91° C. while the pressure increased from 200 pounds per square inch gauge (psig) to 400 psig. The temperature and pressure can be increased more by increasing the concentration of the two salts and decreasing the amount of acid. For example, when the acetic acid concentration decreased from 10 to 5 vol % the temperature increased as shown in FIG. 4.

During the reaction in this example, the temperature and pressure increased with respect to time over the course of about 60 minutes, starting at about 200 psig and 72° C. and reaching a maximum of about 400 psig and 91° C.

Example 2

Figure 5:
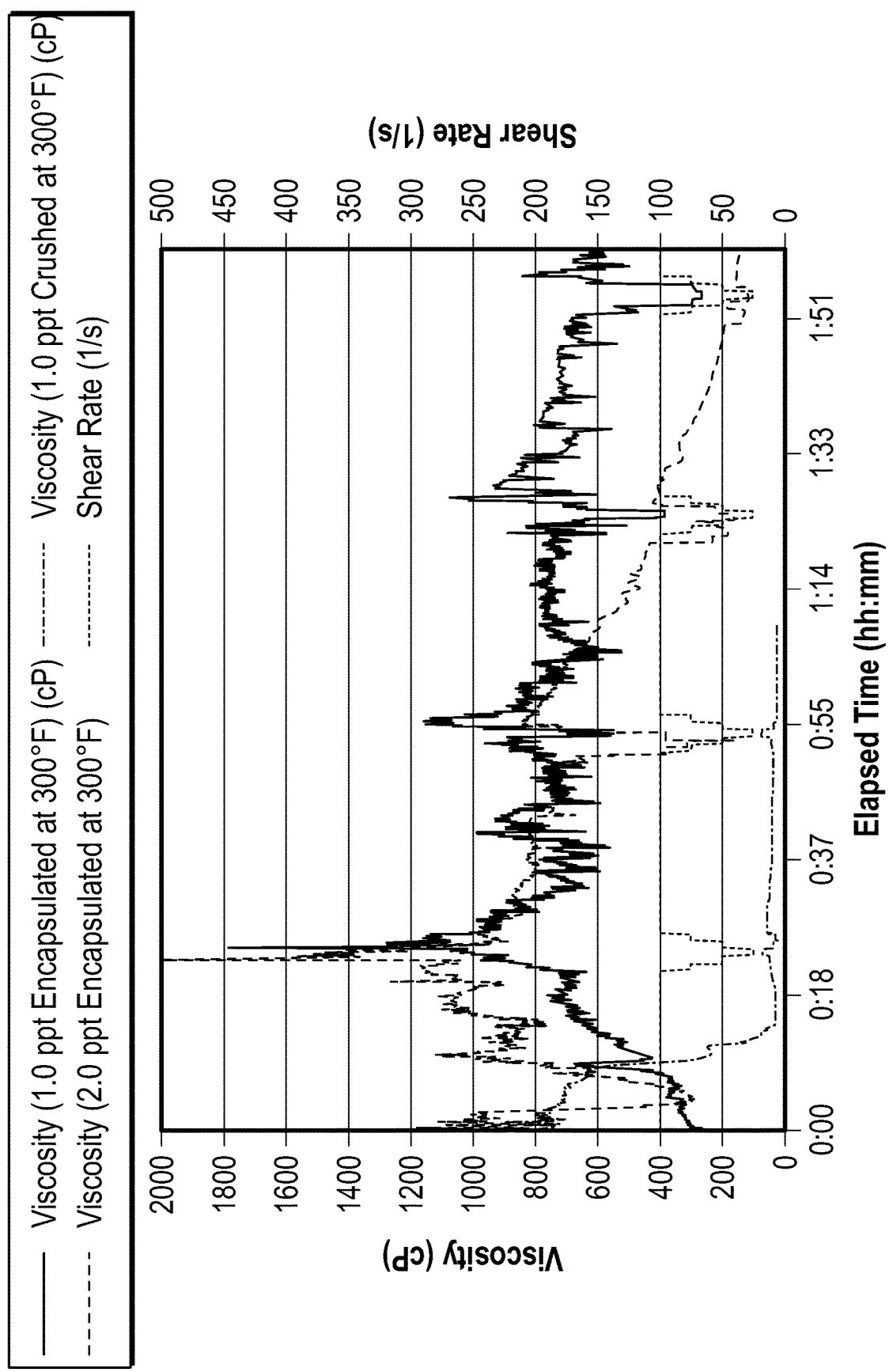
FIG. 5 is a plot detailing the effect of encapsulated breaker concentration on the viscosity of a guar-gum based fracturing fluid from Example 2.

FIG. 5 shows the effect of an encapsulated breaker on several different guar gum-based fracturing fluids. Viscosity measurements were conducted for fracturing fluids with/without breaker using a Chandler Engineering Model 5550 viscometer. The viscometer used standard R1/B5 bob and rotor combinations which required a sample volume of 52 cubic centimeters ($cm^3$). The Chandler viscometer uses sliding carbon block for dry heating and the temperature sensor was mounted on the stator/bob to control sample temperature. A pressure of 600 psig was applied to minimize evaporation of the sample and to keep all generated gases in liquid state. The viscosity measurements were carried out as per API RP39 at shear rates of: 100, 75, 50, and 25 reciprocal seconds ($sec^{-1}$) then backward to 100 $sec^{-1}$ with interval rate set at 100 $sec^{-1}$ for 20 minutes between each sequence.

In FIG. 5, fracturing fluid viscosities with differing gelling agent loadings and encapsulated breaker concentrations (1.0 ppt and 2.0 ppt) and unencapsulated breaker (1.0 ppt) are shown with respect to time. In the fracturing fluid with unencapsulated breaker, a loading of 25 Lb/1000 gallons gelling agent and 1.0 ppt encapsulated breaker with crushed encapsulation was used. Fluid compositions are provided in Table 4. All materials listed in Table 4 were provided by Innospec Co.

TABLE 4

Fluid compositions of Example 2

| Additive | 25 Lb Loading Concentration | 18 Lb Loading Concentration | Unit |
| --- | --- | --- | --- |
| Gelling agent LFC-G4 | 25 | 18 | Lb/1000 gal (Pounds per 1000 gallons of fluid) |
| Clay stabilizer ClayBrake™ 200 | 2 | 2 | gpt (gallons/1000 gallons of fluid) |
| Surfactant Surf-Flo™ 5000 | 2 | 2 | gpt |
| Biocide BioSuite T20-I | 0.25 | 0.2 | gpt |
| Gel stabilizer Gel Stay™ 100 | 2 | N/A | gpt |
| pH buffer GelTrol™ 400 | 6 | 2.8 | gpt |

TABLE 4-continued

Fluid compositions of Example 2

| Additive | 25 Lb Loading Concentration | 18 Lb Loading Concentration | Unit |
|---|---|---|---|
| crosslinker XLW-U2 | 2.75 | 1.5 | gpt |
| Borate crosslinker XLW-B2 | 0.75 | 0.75 | gpt |
| Encapsulated breaker GelBrake™ 250 | 1 | 2 | ppt (parts per thousand) |
| HT breaker GelBrake™ 700 | 2 | N/A | ppt |
| LT breaker GelBrake™ 100 | N/A | 0.1 | ppt |

The viscosity of the fracturing fluid with the unencapsulated breaker decreased much more rapidly than that of the encapsulated breaker at 300° F., with the viscosity of the fracturing fluid comprising encapsulated breaker decreasing over a longer period of time at the given conditions than the unencapsulated breaker, indicating controlled release under encapsulation at 300° F.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method to enhance performance of encapsulated breakers comprising:
   injecting into a fractured wellbore a fluid comprising an ammonium-comprising compound through a first tubing and a fluid comprising sodium nitrite through a second tubing,
   wherein the fractured wellbore has been fractured with a fracturing fluid comprising an encapsulated breaker; and
   reacting the ammonium-comprising compound and the sodium nitrite in an exothermic chemical reaction, wherein the molar ratio of the sodium nitrite to the ammonium-comprising compound ranges from 4:1 to 1:1, the exothermic chemical reaction generating heat to release the encapsulated breaker from encapsulation within 60 minutes.

2. The method of claim 1, wherein the fracturing fluid comprises water.

3. The method of claim 1, wherein the exothermic reaction between the ammonium-comprising compound and the sodium nitrite takes place within a geological formation.

4. The method of claim 1, wherein the exothermic reaction further produces a gas.

5. The method of claim 3, wherein releasing the encapsulated breaker reduces the viscosity of a polymer-comprising fluid comprising a proppant and at least one polymer, wherein the polymer-comprising fluid is subsequently removed from the wellbore; and wherein the proppant remains behind in one or more fractures inside the geological formation.

6. The method of claim 1, wherein the ammonium-comprising compound is ammonium chloride.

7. The method of claim 1, wherein an acid is injected into the wellbore.

8. The method of claim 7, wherein the acid is selected from the group consisting of acetic acid, formic acid, propionic acid, lactic acid, citric acid, and combinations thereof.

9. The method of claim 1, wherein the fluid comprising the ammonium-comprising compound and the fluid comprising sodium nitrite are mixed in a reactant solution, wherein the reactant solution has a pH of about 8 to about 9.

10. The method of claim 9, wherein mixing the fluid comprising the ammonium-comprising compound and the fluid comprising sodium nitrite in the reactant solution occurs in a third tubing.

11. The method of claim 1, wherein the temperature of the geological formation is at least about 70° C.

12. The method of claim 1, wherein the concentration of the ammonium-comprising compound in the fluid comprising the ammonium-comprising compound is from about 1M to about 5M.

13. The method of claim 1, wherein the concentration of the sodium nitrite in the fluid comprising the sodium nitrite is from about 1M to about 5M.

14. A system comprising:
   a reacting fluid for breaking chemical bonds in a polymer in a geological formation comprising an encapsulated breaker;
   sodium nitrite in a first solution; and
   an ammonium-comprising compound in a second solution,
   wherein the molar ratio of the sodium nitrite to the ammonium-comprising compound ranges from 4:1 to 1:1; and
   wherein the sodium nitrite and the ammonium-comprising compound undergo an exothermic reaction producing generated heat upon contact of the first and second solutions in the reacting fluid wherein:

the generated heat is operable to release the encapsulated breaker from encapsulation within 60 minutes.

15. A composition comprising:
a reacting fluid for breaking chemical bonds in a polymer in a geological formation comprising:
an encapsulated breaker;
aqueous sodium nitrite; and
an aqueous ammonium-comprising compound,
wherein the molar ratio of the aqueous sodium nitrite to the aqueous ammonium-comprising compound ranges from 4:1 to 1:1, and
wherein the aqueous sodium nitrite and the aqueous ammonium-comprising compound undergo an exothermic reaction upon contact in a fractured wellbore in the geological formation producing generated heat wherein:
the generated heat is operable to release the encapsulated breaker from encapsulation within 60 minutes.

16. The composition of claim 15, wherein the ammonium-comprising compound is ammonium chloride.

17. The composition of claim 15, wherein the reacting fluid further comprises an acid that is operable to initiate the exothermic reaction.

18. The composition of claim 17, wherein the acid is selected from the group consisting of acetic acid, formic acid, propionic acid, lactic acid, citric acid, and combinations thereof.

* * * * *